US010366345B2

(12) United States Patent
Evans

(10) Patent No.: US 10,366,345 B2
(45) Date of Patent: Jul. 30, 2019

(54) CONTINUOUS INTERACTION LEARNING AND DETECTION IN REAL-TIME

(71) Applicant: Intel Corporation, Santa Clara, CA (US)

(72) Inventor: Chuck Evans, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/182,295

(22) Filed: Jun. 14, 2016

(65) Prior Publication Data
US 2016/0371604 A1 Dec. 22, 2016

Related U.S. Application Data

(63) Continuation of application No. 13/976,744, filed as application No. PCT/US2013/032449 on Mar. 15, 2013, now Pat. No. 9,390,380.

(51) Int. Cl.
G06F 15/18 (2006.01)
G06N 20/00 (2019.01)
(Continued)

(52) U.S. Cl.
CPC ......... G06N 20/00 (2019.01); G06K 9/00335 (2013.01); G06K 9/6256 (2013.01);
(Continued)

(58) Field of Classification Search
CPC ...... G06N 99/005; G06N 5/025; G06N 7/005; G06K 9/6256; G06K 9/6269
See application file for complete search history.

(56) References Cited

U.S. PATENT DOCUMENTS 5,768,420 A 6/1998 Brown et al.
7,308,443 B1 12/2007 Lee et al.
(Continued)

FOREIGN PATENT DOCUMENTS

CN 102227767 A 10/2011
GB 2385699 A 8/2003
WO 2012/093147 A1 7/2012

OTHER PUBLICATIONS

International Search Report and Written Opinion for International Patent Application No. PCT/US2013/032449, dated Dec. 18, 2013, 9 pages.
(Continued)

Primary Examiner — Luis A Sitiriche
(74) Attorney, Agent, or Firm — Jordan IP Law, LLC

(57) ABSTRACT

Systems and methods may provide for partitioning a plurality of training samples into a first sequential list of centroids, removing one or more repeating centroids in the first sequential list of centroids to obtain a first reduced list of centroids and generating a set of Hidden Markov Model (HMM) parameters based on the first reduced list of centroids. Additionally, a plurality of detection samples may be partitioned into a second sequential list of centroids, wherein one or more repeating centroids in the second sequential list of centroids may be removed to obtain a second reduced list of centroids. The second reduced list of centroids may be used to determine a match probability for the plurality of detection samples against the set of HMM parameters. In one example, the reduced lists of centroids lack temporal variability.

16 Claims, 5 Drawing Sheets

(51) Int. Cl.
*G06K 9/62* (2006.01)
*G06N 7/00* (2006.01)
*G06K 9/00* (2006.01)
*G10L 15/14* (2006.01)

(52) U.S. Cl.
CPC ......... *G06K 9/6272* (2013.01); *G06K 9/6297* (2013.01); *G06N 7/005* (2013.01); *G10L 15/142* (2013.01); *G10L 15/14* (2013.01)

(56) References Cited

U.S. PATENT DOCUMENTS

| | | |
|---|---|---|
| 2004/0120554 A1 | 6/2004 | Lin et al. |
| 2009/0006093 A1 | 1/2009 | Das |
| 2009/0052785 A1 | 2/2009 | Shamaie |
| 2009/0324026 A1 | 12/2009 | Kletter |
| 2010/0121638 A1 | 5/2010 | Pinson et al. |
| 2010/0239139 A1 | 9/2010 | Hunt et al. |
| 2012/0016641 A1 | 1/2012 | Raffa et al. |

OTHER PUBLICATIONS

International Preliminary Report on Patentability for International Patent Application No. PCT/US2013/032449, dated Sep. 24, 2015, 6 pages.

Alon et al., "A Unified Framework for Gesture Recognition and Spatiotemporal Gesture Segmentation", IEEE Transactions of Pattern Analysis and Machine Intelligence (PAMI), Sep. 2009, 18 pages.

Ouivirach et al., "Clustering Human Behaviors with Dynamic Time Warping and Hidden Markov Models for a Video Surveillance System", Electrical Engineering/Electronics Computer Telecommunications and Information Technology (ECTI-CON), 2010 International Conference, May 19-21, 2010, 5 pages.

Xiaoyan Wang et al., "Hidden-Markov-Models-Based Dynamic Hand Gesture Recognition", Mathematical Problems in Engineering, vol. 12, 2012, Hindawi Publishing Corporation, 12 pages.

Hyeon-Kyu Lee et al., "An HMM-Based Threshold Model Approach for Gesture Recognition", IEEE Transactions on Pattern Analysis and Machine Intelligence, vol. 21, No. 10, Oct. 1999, 13 pages.

Nguyen Dang Binh et al., "Real-Time Hand Tracking and Gesture Recognition System", GVIP 05 Conference, Dec. 19-21, 2005, CICC, Cairo, Egypt, 7 pages.

Jie Yang et al., "Hidden Markov Model for Gesture Recognition", The Robotics Institute, Carnegie Mellon University, May 1994, 31 pages.

Notice of Allowance for Chinese Patent Application No. 201380073060. X, dated Jul. 12, 2017, 8 pages including 4 pages of English translation.

European Search Report for EP Patent Application No. 13878402.0, dated Jun. 1, 2017, 9 pages.

Jay Shankar Prasad et al., "Clustering Method Evaluation for Hidden Markov Model Based Real-Time Gesture Recognition", 2009 International Conference on Advances in Recent Technologies in Communication and Computing, IEEE, Oct. 27, 2009, pp. 419-423.

Yona Falinie Abdul Gaus et al., "Hidden Markov Model-based Gesture Recognition with Overlapping Hand-Head/Head-Hand Estimated Using Kalman Filter", 2012 Third International Conference on Intelligent Systems Modelling and Simulation, IEEE, Feb. 8, 2012, pp. 262-267.

John Hiesey et al., "Incorporating Weighted Clustering in 3D Gesture Recognition", Dec. 16, 2011, pp. 1-5.

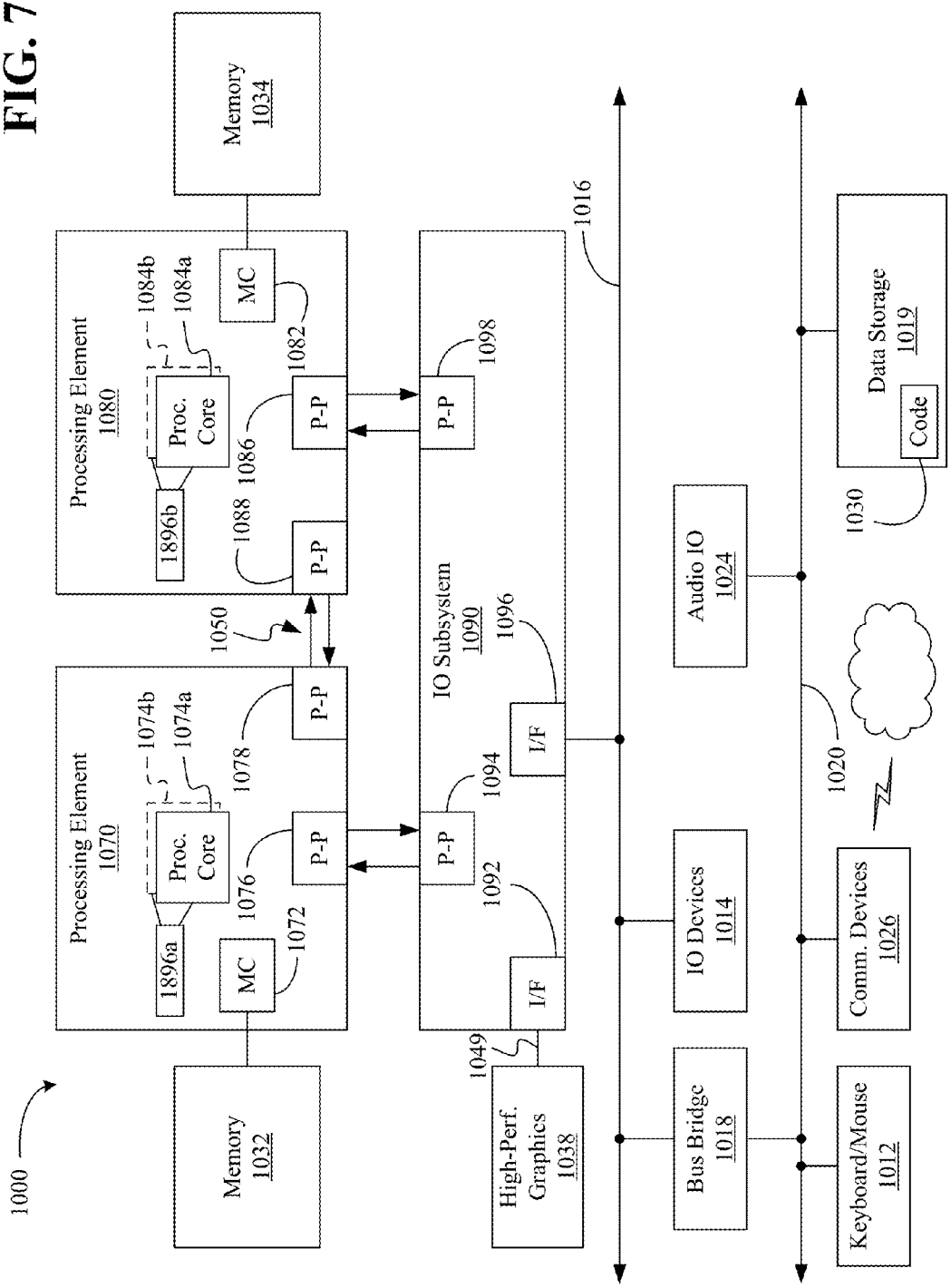

CONTINUOUS INTERACTION LEARNING AND DETECTION IN REAL-TIME

CROSS-REFERENCE TO RELATED APPLICATIONS

The present application is a continuation of U.S. National Phase patent application Ser. No. 13/976,744 filed on Jan. 27, 2014, which claims benefit to International Patent Application No. PCT/US2013/032449 filed on Mar. 15, 2013.

TECHNICAL FIELD

Embodiments generally relate to computer-based detection of interactions such as gestures and verbal input. More particularly, embodiments relate to the continuous learning and detection of human interactions in real-time.

BACKGROUND

Human motions have many subtleties that may make modeling of the motion difficult, if not impossible within a reasonable time frame. For example, because both space and time may factor into the model of a given gesture, the population whose gestures need to be detected may likely have large differences in how fast the gestures are executed. Factoring these variations into the model may introduce uncertainty, which may reduce the reliability of gesture detection decisions. Moreover, traditional detection algorithms may perform a time-consuming search for potential start and end points of the gesture of interest, which may slow performance and make the detection of back-to-back gestures (e.g., continuous detection) infeasible. Simply put, the processing time of conventional gesture learning and detection systems may be prohibitive for real-time systems.

BRIEF DESCRIPTION OF THE DRAWINGS

The various advantages of the embodiments will become apparent to one skilled in the art by reading the following specification and appended claims, and by referencing the following drawings, in which:

FIG. 7 is a block diagram of an example of a system according to an embodiment.

DESCRIPTION OF EMBODIMENTS

Figure 1:
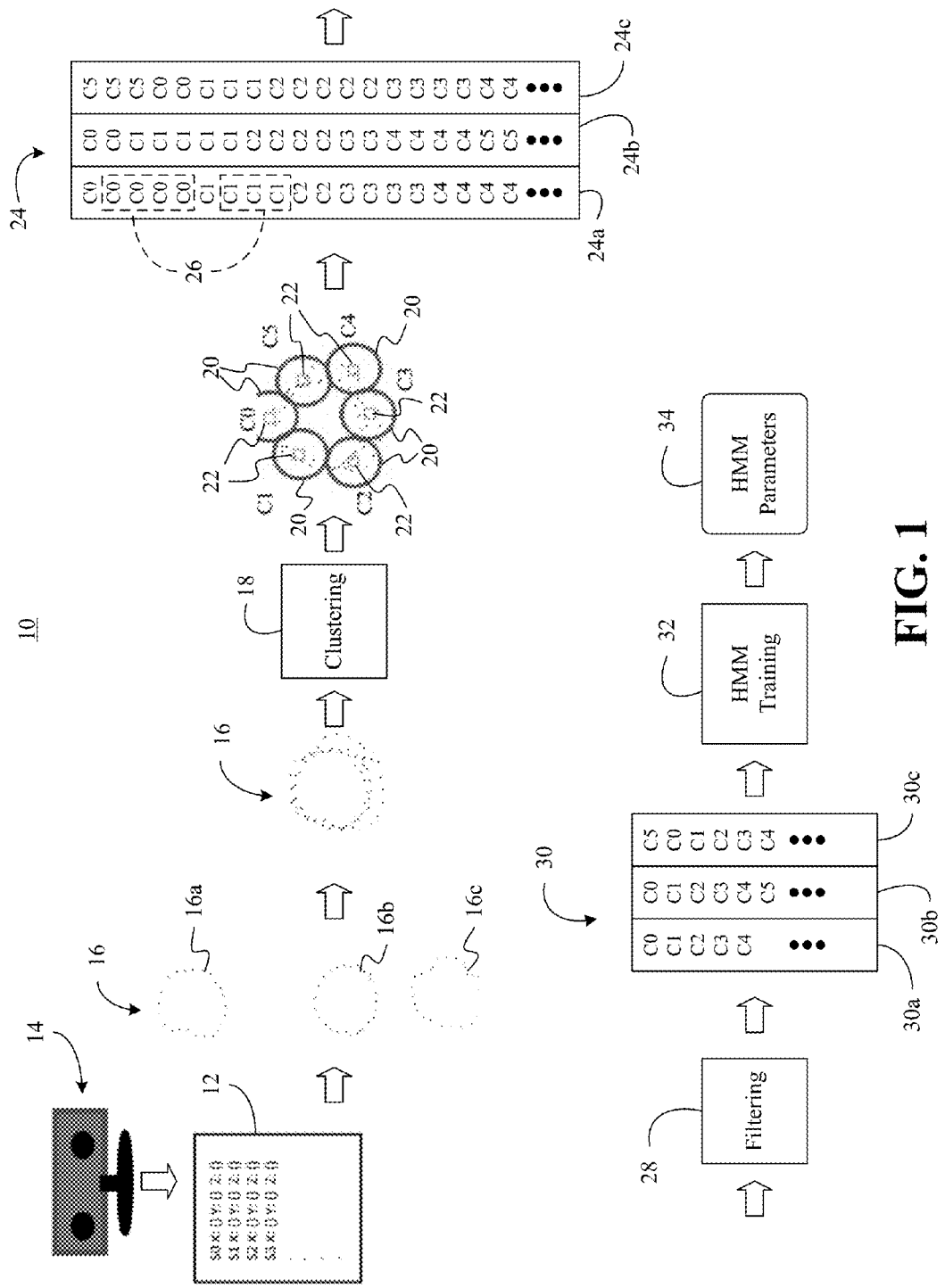
FIG. 1 is a block diagram of an example of a learning/training sequence according to an embodiment.

Turning now to FIG. 1, a training sequence 10 is shown for a plurality of training samples 16 (16a-16c). In one example, the training samples 16 represent gesture samples (e.g., human gesture input) captured by a sensor 14 such as, for example, an image/depth sensor during one or more training sessions. In such a case, the training samples 16 may be derived from spatial coordinates 12 (e.g., two-dimensional/2D, three-dimensional/3D, n-dimensional) that correspond to the location of a physical component (e.g., hand, finger, iris, etc.) of one or more subjects (e.g., humans, animals, robots, machines) during the training sessions.

For example, a first collection of training samples 16a may correspond to a first subject (e.g., individual from a first demographic), a second collection of training samples 16b may correspond to a second subject (e.g., individual from a second demographic), a third collection of training samples 16c may correspond to a third subject (e.g., individual from a third demographic), and so forth. The subjects might be visually monitored and/or recorded while making a particular hand motion such as, for example, a circular hand motion.

The training samples 16 may also represent speech samples (e.g., human verbal input), wherein the sensor 14 might include a microphone placed in audible range of one or more subjects during the training sessions. In such a case, the training samples 16 may include phoneme data extracted from the verbal input. Other types of interaction data may also be used for the training samples 16.

The training samples 16 may be subjected to a clustering process 18 that determines a set of clusters 20 ("C0" to "C5") for the training samples 16. The number of clusters in the set of clusters 20 may be determined in advance based on a target resolution. In this regard, certain tradeoffs between resolution and processing speed may be made when setting the number of clusters. The clustering process 18 may also determine a set of cluster centroids 22 corresponding to the set of clusters 20, wherein each centroid in the set of centroids 22 may indicate the center point of a corresponding cluster. Additionally, each training sample in the plurality of training samples 16 may be assigned to a centroid in the set of cluster centroids 22. Thus, each of the spatial coordinates 12 may be assigned to the nearest centroid in order to conduct the assignment. In one example, the clustering process 18 uses k-means clustering to determine the set of clusters 20 and the set of cluster centroids 22 for the training samples 16.

For example, k-means clustering may provide for placing the centroids as far away from one another as possible and associating each sample belonging to the training samples 16 with the nearest centroid to obtain an "early groupage". When no samples are pending, k new centroids may be re-calculated as "barycenters" of the clusters resulting from the early groupage. Once the k new centroids have been determined, a new binding may be done between the training samples 16 and the nearest new centroid. The result may be a loop in which the k centroids change their location step-by-step until no more changes are done. As will be discussed in greater detail, each centroid may be identified by a unique value to be used when training a Hidden Markov Model (HMM). An HMM may generally contain a number of states, wherein each state has an associated observation probability distribution that determines the probability of generating an observation at a particular moment in time and each pair of states and has an associated transition probability. In one example, an algorithm and/or process such as the Baum-Welch algorithm may be used to train the HMM.

Thus, the illustrated clustering process 18 partitions the training samples 16 into a sequential list of centroids 24 (24a-24c). For example, a first column 24a in the sequential list of centroids 24 may correspond to the first collection of training samples 16a, a second column 24b may correspond to the second collection of training samples 16b, a third column 24c may correspond to the third collection of training samples 16c, and so forth, wherein the entries in the sequential list of centroids 24 may contain the unique values/identifiers of the centroids. Of particular note is that the illustrated sequential list of centroids 24 includes sequentially repeating centroids such as, for example, repeating centroids 26, which represent a temporal dimension of the training samples 16 (e.g., depending upon the sample rate). As will be discussed in greater detail, removing this temporal dimension may in turn eliminate temporal variability and enable real-time, continuous learning and detection of interactions.

More particularly, the sequential list of centroids 24 may be subjected to a filtering process 28 that removes sequentially repeating centroids such as the repeating centroids 26 from the sequential list of centroids 24 to obtain a reduced list of centroids 30 (30a-30c). The illustrated reduced list of centroids 30 therefore lacks temporal variability. The reduced list of centroids 30 may then be fed to an HMM training process 32, which generates a set of HMM parameters 34 based on the reduced list of centroids 30. The set of clusters 20 may have a one-to-one mapping to states in the HMM. Such an approach may create a model that has increased robustness by effectively prioritizing transitions between clusters over transitions within clusters (e.g., prioritizing C0→C1 transitions over C0→C0 transitions). As will be discussed in greater detail, the increased robustness may further facilitate real-time, continuous learning and detection of interactions.

Figure 2:
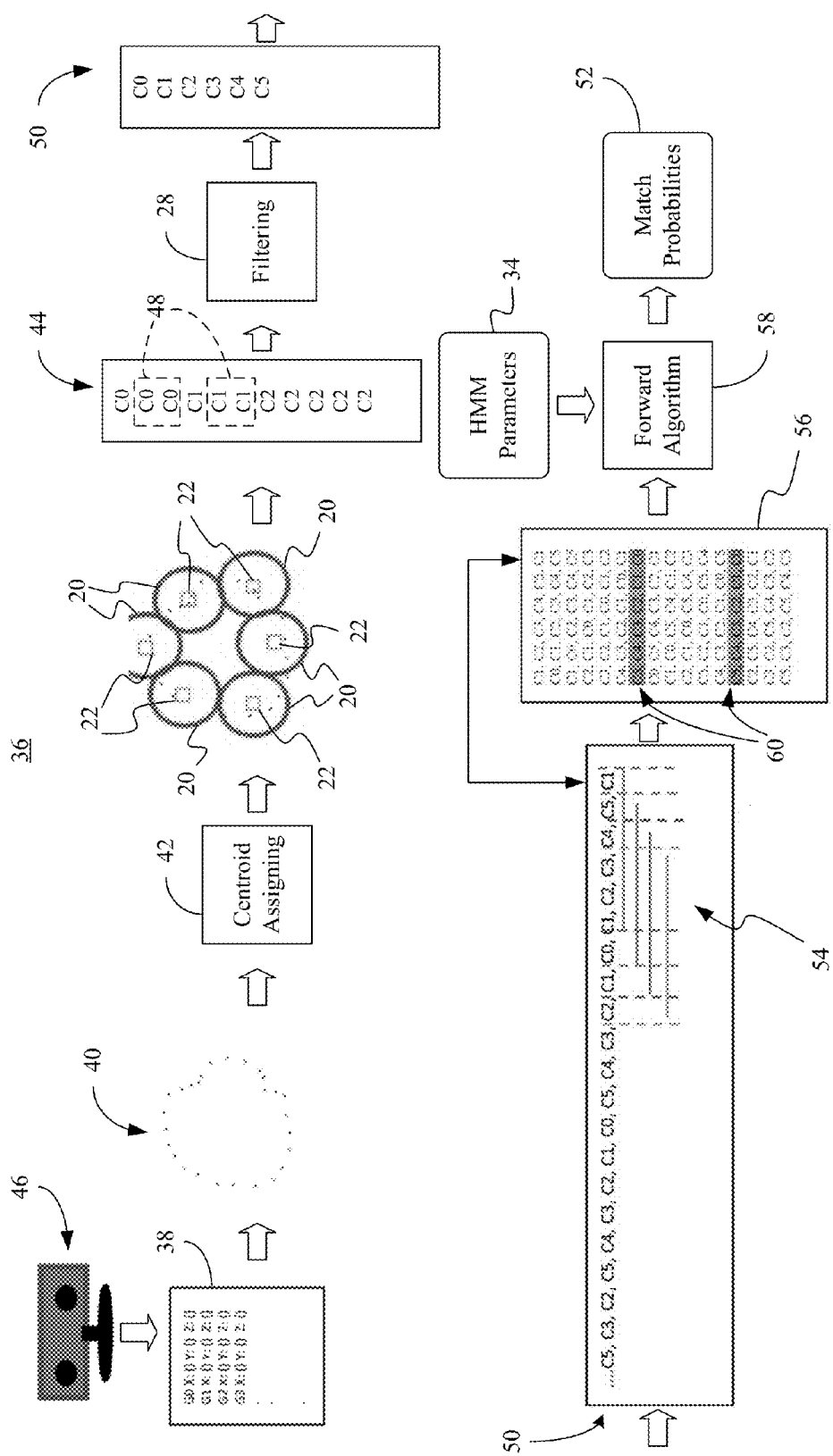
FIG. 2 is a block diagram of an example of a detection sequence according to an embodiment.

FIG. 2 shows a detection sequence 36 in which a plurality of detection samples 40 associated with spatial coordinates 38 are fed to a centroid assigning process 42. The detection samples 40 may therefore represent gesture samples, speech samples, etc., captured by a sensor 46 during real-time operation of a system such as, for example, a game system, video conferencing system, messaging system, social networking system, and so forth. The illustrated centroid assigning process 42 partitions the detection samples 40 into a sequential list of centroids 44 based on the same cluster and centroid arrangement determined in a training sequence such as, for example, the training sequence 10 (FIG. 1), already discussed. The sequential list of centroids 44 may therefore have a temporal dimension that a filtering process 28 eliminates by removing one or more sequentially repeating centroids such as, for example, centroids 48 from the sequential list of centroids 44. As a result, a reduced list of centroids 50 may be obtained, wherein the reduced list of centroids 50 lacks temporal variability. Simply put, removing the repeating centroids 48 may preserve the transitions from one cluster to another, while removing the dependency on duration at a particular cluster.

The illustrated detection sequence 36 also provides for using the reduced list of centroids 50 to determine one or more match probabilities 52 for the detection samples 40 against a set of HMM parameters 34 associated with a training session. More particularly, a sliding window 54 may be applied to the reduced list of centroids 50 to obtain a candidate list 56 for a forward algorithm 58. For example, a first entry in the candidate list 56 is, from right-to-left, "C1,C5,C4,C3,C2,C1", which corresponds to the rightmost position of the sliding window 54 in the illustrated example. Similarly, a second entry in the candidate list 56 is, from right-to-left, "C5,C4,C3,C2,C1,C0", which corresponds to the next position of the sliding window 54 in the illustrated example. Each of the entries in the candidate list 56 may be subjected to the forward algorithm 58 in order determine a match probability 52 for the underlying interaction (e.g., gesture interaction, speech interaction). In this regard, candidate entries 60 may result in relatively high match probabilities 52.

Of particular note is that the illustrated sliding window 54 has a fixed width that equals the number of clusters (i.e., six) in the set of clusters 20 and the number of states in the HMM. Moreover, the set of clusters 20 may have a one-to-one mapping to states in the HMM. A fixed window size and one-to-one mapping may provide increased efficiency by eliminating any need to search over a large span of samples to locate the start and endpoints of an interaction. Additionally, the sliding window may enable continuous detection of back-to-back interactions without incurring additional computation overhead.

Figure 3:
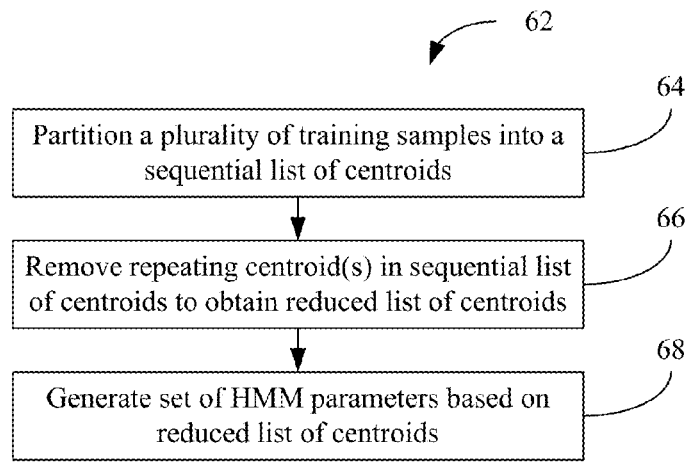
FIG. 3 is a flowchart of an example of a method of processing training samples according to an embodiment.

Turning now to FIG. 3, a method 62 of processing training samples is shown. The method 62 may be implemented in a computing device as a set of logic instructions and/or firmware stored in a machine- or computer-readable medium such as random access memory (RAM), read only memory (ROM), programmable ROM (PROM), flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 62 may be written in any combination of one or more programming languages, including an object oriented programming language such as C++ or the like and conventional procedural programming languages, such as the "C" programming language or similar programming languages. Moreover, the method 62 may be implemented using any of the aforementioned circuit technologies.

Illustrated processing block 64 provides for partitioning a plurality of training samples into a sequential list of centroids. As already noted, the training samples may include gesture samples, speech samples, and so forth. Block 64 may therefore involve determining a set of clusters for the plurality of training samples, determining a set of cluster centroids corresponding to the set of clusters, and assigning each training sample in the plurality of training samples to a centroid in the set of cluster centroids. One or more repeating centroids in the sequential list of centroids may be removed at block 66 to obtain a reduced list of centroids, wherein the reduced list of centroids lacks temporal variability. Illustrated block 68 generates a set of Hidden Markov Model (HMM) parameters based on the reduced list of centroids. In one example, the sequential list of centroids is associated with a set of clusters that has a one-to-one mapping to states in the HMM.

Figure 4:
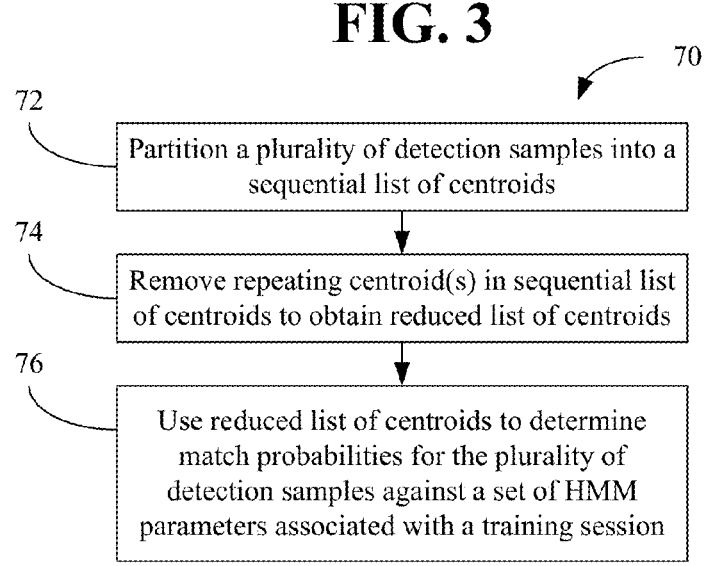
FIG. 4 is a flowchart of an example of a method of processing detection samples according to an embodiment.

FIG. 4 shows a method 70 of processing detection samples. The method 70 may be implemented in a computing device as a set of logic instructions and/or firmware stored in a machine- or computer-readable medium such as RAM, ROM, PROM, flash memory, etc., in configurable logic such as, for example, PLAs, FPGAs, CPLDs, in fixed-functionality logic hardware using circuit technology such as, for example, ASIC, CMOS or TTL technology, or any combination thereof. Illustrated processing block 72 provides for partitioning a plurality of detection samples into a sequential list of centroids. As already noted, the detection samples may include gesture samples, speech samples, and so forth. Block 72 may therefore involve assigning each detection sample in the plurality of detection samples to a centroid in a set of cluster centroids associated with a training sequence.

One or more repeating centroids may be removed from the sequential list of centroids at block 74 to obtain a reduced list of centroids, wherein the reduced list of centroids may lack temporal variability, as already discussed. Illustrated block 76 uses the reduced list of centroids to determine one or more match probabilities for the plurality of detection samples against a set of HMM parameters associated with one or more training sessions. In one example, block 76 involves applying a sliding window to the reduced list of centroids, wherein the sliding window has a fixed width that equals the number of clusters in a set of clusters associated with the sequential list of centroids. Moreover, the set of clusters may have a one-to-one mapping to states in the HMM.

Figure 5:
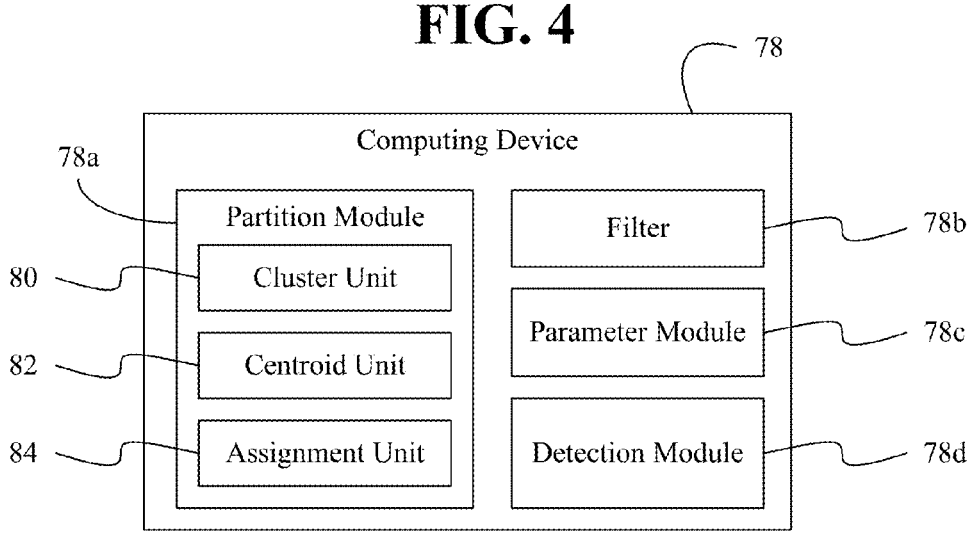
FIG. 5 is a block diagram of an example of a computing device according to an embodiment.

Turning now to FIG. 5, a computing device 78 (78a-78d) is shown. The computing device 78 may include, for example, a desktop computer, workstation, notebook computer, smart tablet, smart phone, mobile Internet device (MID), media player, etc., or any combination thereof. The computing device 78 may generally be used to conduct training sequences such as, for example, the training sequence 10 (FIG. 1) and/or to conduct detection sequences such as, for example, the detection sequence 36 (FIG. 2), already discussed. The illustrated computing device 78 includes a partition module 78a to partition a plurality of training samples into a sequential list of centroids, a filter 78b to remove one or more sequentially repeating centroids from the sequential list of centroids to obtain a reduced list of centroids, and a parameter module 78c to generate a set of HMM parameters based on the reduced list of centroids.

In one example, the partition module 78a includes a cluster unit 80 to determine a set of clusters for the plurality of training samples, a centroid unit 82 to determine a set of cluster centroids corresponding to the set of clusters, and an assignment module 84 to assign each training sample in the plurality of training samples to a centroid in the set of cluster centroids. The partition module 78a may use a process such as, for example, a k-clustering process to partition the training samples.

Additionally, the partition module 78a may partition a plurality of detection samples into a sequential list of centroids, wherein the illustrated filter 78b removes one or more repeating centroids from the sequential list of centroids corresponding to the detection samples. The illustrated computing device 78 also includes a detection module 78d to use the reduced list of centroids to determine a match probability for the plurality of detection samples against a set of HMM parameters associated with a training session.

Figure 6:
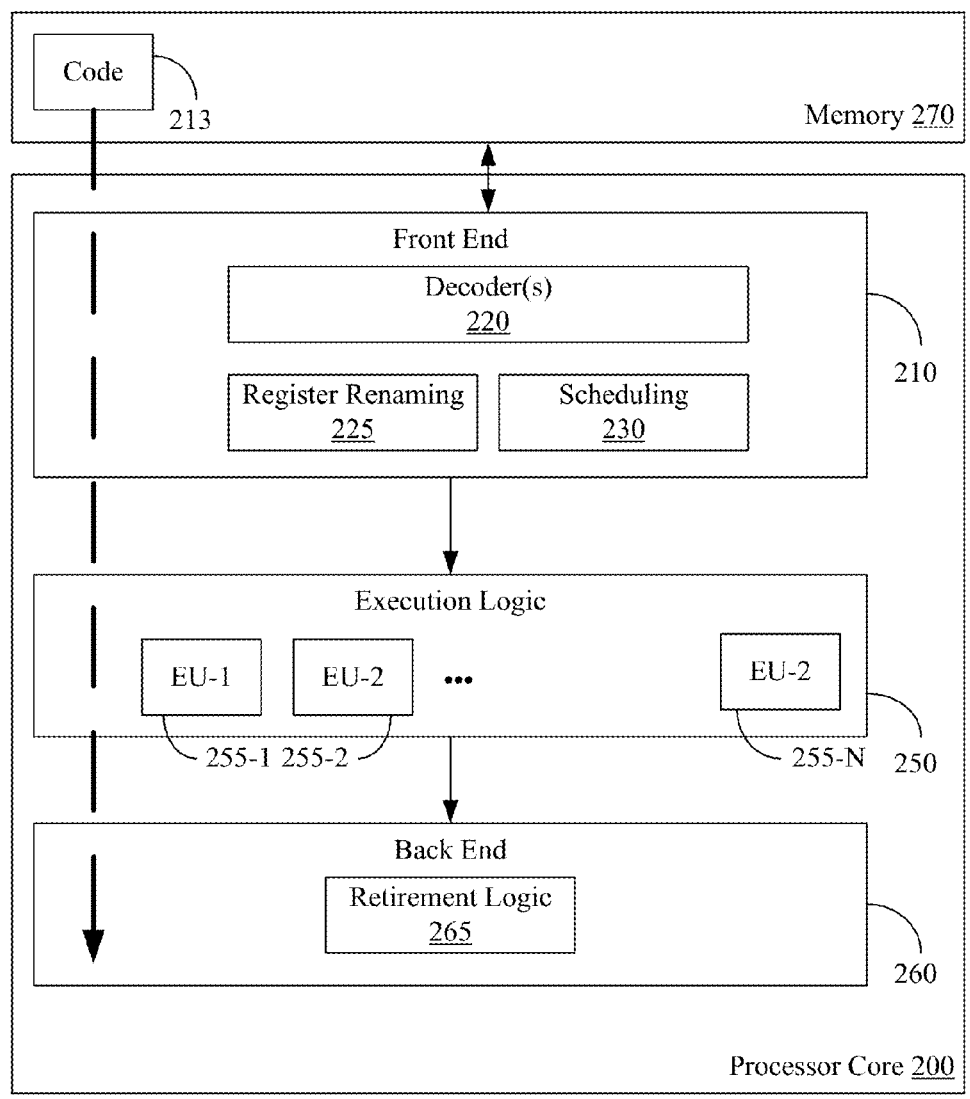
FIG. 6 is a block diagram of an example of a processor according to an embodiment.

FIG. 6 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 6, a processing element may alternatively include more than one of the processor core 200 illustrated in FIG. 6. The processor core 200 may be a single-threaded core or, for at least one embodiment, the processor core 200 may be multithreaded in that it may include more than one hardware thread context (or "logical processor") per core.

FIG. 6 also illustrates a memory 270 coupled to the processor 200. The memory 270 may be any of a wide variety of memories (including various layers of memory hierarchy) as are known or otherwise available to those of skill in the art. The memory 270 may include one or more code 213 instruction(s) to be executed by the processor 200 core, wherein the code 213 may implement the method 62 (FIG. 3), and/or the method 70 (FIG. 4), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end 210 also includes register renaming logic 225 and scheduling logic 230, which generally allocate resources and queue the operation corresponding to the convert instruction for execution.

The processor 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 6, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 7, shown is a block diagram of a system 1000 embodiment in accordance with an embodiment. Shown in FIG. 7 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 7 may be implemented as a multi-drop bus rather than point-to-point interconnect.

As shown in FIG. 7, each of processing elements 1070 and 1080 may be multicore processors, including first and second processor cores (i.e., processor cores 1074a and 1074b and processor cores 1084a and 1084b). Such cores 1074, 1074b, 1084a, 1084b may be configured to execute instruction code in a manner similar to that discussed above in connection with FIG. 6.

Each processing element 1070, 1080 may include at least one shared cache 1896a, 1896b. The shared cache 1896a, 1896b may store data (e.g., instructions) that are utilized by one or more components of the processor, such as the cores

1074*a*, 1074*b* and 1084*a*, 1084*b*, respectively. For example, the shared cache 1896*a*, 1896*b* may locally cache data stored in a memory 1032, 1034 for faster access by components of the processor. In one or more embodiments, the shared cache 1896*a*, 1896*b* may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 7, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 7, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 7, various I/O devices 1014 (e.g., cameras, microphones) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement the method 62 (FIG. 3), and/or the method 70 (FIG. 4), and may be similar to the code 213 (FIG. 6), already discussed. Further, an audio I/O 1024 may be coupled to second bus 1020, wherein the audio I/O 1024 may be used to establish a headset connection.

Note that other embodiments are contemplated. For example, instead of the point-to-point architecture of FIG. 7, a system may implement a multi-drop bus or another such communication topology. Also, the elements of FIG. 7 may alternatively be partitioned using more or fewer integrated chips than shown in FIG. 7.

ADDITIONAL NOTES AND EXAMPLES

Example 1 may include an apparatus to process training samples, including a partition module to partition a plurality of training samples into a sequential list of centroids. The apparatus may also include a filter to remove one or more repeating centroids in the sequential list of centroids to obtain a reduced list of centroids and a parameter module to generate a set of Hidden Markov Model (HMM) parameters based on the reduced list of centroids.

Example 2 may include the apparatus of example 1, wherein the reduced list of centroids is to lack temporal variability.

Example 3 may include the apparatus of example 1, wherein the sequential list of centroids is to be associated with a set of clusters having a one-to-one mapping to states in the HMM.

Example 4 may include the apparatus of example 1, wherein the partition module includes a cluster unit to determine a set of clusters for the plurality of training samples, a centroid unit to determine a set of cluster centroids corresponding to the set of clusters, and an assignment unit to assign each training sample in the plurality of training samples to a centroid in the set of cluster centroids.

Example 5 may include the apparatus of any one of examples 1 to 4, wherein the partition module is to partition a plurality of gesture samples into the sequential list of centroids.

Example 6 may include the apparatus of any one of examples 1 to 4, wherein the partition module is to partition a plurality of speech samples into the sequential list of centroids.

Example 7 may include a method to process training samples, including partitioning a plurality of training samples into a sequential list of centroids. The method may also provide for removing one or more repeating centroids in the sequential list of centroids to obtain a reduced list of centroids, and generating a set of Hidden Markov Model (HMM) parameters based on the reduced list of centroids.

Example 8 may include the method of example 7, wherein the reduced list of centroids lacks temporal variability.

Example 9 may include the method of example 7, wherein sequential list of centroids is associated with a set of clusters having a one-to-one mapping to states in the HMM.

Example 10 may include the method of example 7, wherein partitioning the plurality of training samples includes determining a set of clusters for the plurality of training samples, determining a set of cluster centroids corresponding to the set of clusters, and assigning each training sample in the plurality of training samples to a centroid in the set of cluster centroids.

Example 11 may include the method of any one of examples 7 to 10, wherein a plurality of gesture samples are partitioned into the sequential list of centroids.

Example 12 may include the method of any one of examples 7 to 10, wherein a plurality of speech samples are partitioned into the sequential list of centroids.

Example 13 may include a method to process detection samples, comprising partitioning a plurality of detection samples into a sequential list of centroids, removing one or more repeating centroids in the sequential list of centroids to obtain a reduced list of centroids, and using the reduced list of centroids to determine a match probability for the plurality of detection samples against a set of Hidden Markov Model (HMM) parameters associated with a training session.

Example 14 may include the method of example 13, wherein the reduced list of centroids lacks temporal variability.

Example 15 may include the method of example 13, wherein the sequential list of centroids is associated with a set of clusters having a one-to-one mapping to states in the HMM.

Example 16 may include the method of example 13, wherein using the list of centroids to determine the match probability includes applying a sliding window to the reduced list of centroids, and wherein the sliding window has a fixed width that equals a number of clusters in a set of clusters associated with the sequential list of centroids.

Example 17 may include the method of any one of examples 13 to 16, wherein a plurality of gesture samples are partitioned into the sequential list of centroids.

Example 18 may include the method of any one of examples 13 to 16, wherein a plurality of speech samples are partitioned into the sequential list of centroids.

Example 19 may include at least one computer readable storage medium having a set of instructions which, if executed by a computing device, cause the computing device to partition a plurality of detection samples into a sequential list of centroids. The instructions, if executed, may also cause a computing device to remove one or more repeating centroids in the sequential list of centroids to obtain a reduced list of centroids, and use the reduced list of centroids to determine a match probability for the plurality of detection samples against a set of Hidden Markov Model (HMM) parameters associated with a training session.

Example 20 may include the at least one computer readable storage medium of example 19, wherein the reduced list of centroids is to lack temporal variability.

Example 21 may include the at least one computer readable storage medium of example 19, wherein the sequential list of centroids is to be associated with a set of clusters having a one-to-one mapping to states in the HMM.

Example 22 may include the at least one computer readable storage medium of example 19, wherein the instructions, if executed, cause a computing device to apply a sliding window to the reduced list of centroids to use the list to determine the match probability, and wherein the sliding window is to have a fixed width that equals a number of clusters in a set of clusters associated with the sequential list of centroids.

Example 23 may include the at least one computer readable storage medium of any one of examples 19 to 22, wherein a plurality of gesture samples are to be partitioned into the sequential list of centroids.

Example 24 may include the at least one computer readable storage medium of any one of examples 19 to 22, wherein a plurality of speech samples are to be partitioned into the sequential list of centroids.

Example 25 may include an apparatus to process detection samples, comprising a partition module partition a plurality of detection samples into a sequential list of centroids, a filter to remove one or more repeating centroids in the sequential list of centroids to obtain a reduced list of centroids, and a detection module to use the reduced list of centroids to determine a match probability for the plurality of detection samples against a set of Hidden Markov Model (HMM) parameters associated with a training session.

Example 26 may include the apparatus of example 25, wherein the reduced list of centroids is to lack temporal variability.

Example 27 may include the apparatus of example 25, wherein the sequential list of centroids is to be associated with a set of clusters having a one-to-one mapping to states in the HMM.

Example 28 may include the apparatus of example 25, wherein the detection module is to apply a sliding window to the reduced list of centroids to use the list to determine the match probability, and wherein the sliding window is to have a fixed width that equals a number of clusters in a set of clusters associated with the sequential list of centroids.

Example 29 may include the apparatus of any one of examples 25 to 28, wherein a plurality of gesture samples are to be partitioned into the sequential list of centroids.

Example 30 may include the apparatus of any one of examples 25 to 28, wherein a plurality of speech samples are to be partitioned into the sequential list of centroids.

Example 31 may include at least one computer readable storage medium comprising a set of instructions which, if executed by a computing device, cause the computing device to perform the method of any one of examples 7 to 12.

Example 32 may include an apparatus to process training samples comprising means for performing the method of any one of examples 7 to 10.

Example 33 may include apparatus to process detection samples comprising means for performing the method of any one of examples 13 to 16.

Techniques described herein may therefore learn and detect interactions such gestures and verbal input on a real-time and continuous basis. For example, eliminating temporal variability in training and detection samples may reduce uncertainty and in turn increase reliability. Additionally, mapping states in an HMM to the centroids/clusters of the training detection samples may enhance efficiency and boost performance. Moreover, the use of a sliding window with a fixed width may further improve efficiency and speed, and ultimately enable real-time and continuous detection.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size may be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

I claim:

1. An apparatus to process training samples, comprising:
a computing device including a sensor to collect a plurality of training samples selected from human motion samples or human verbal samples, the computing device including:
a partition module, implemented at least partly in one or more of configurable logic or fixed-functionality logic hardware, to partition the plurality of training samples into a sequential list of centroids including non-repeating centroids and one or more repeating centroids, wherein the sequential list has a first of the non-repeating centroids, the one or more repeating centroids and a second of the non-repeating centroids in that stated order so that the first non-repeating centroid is to transition to the one or more repeating centroids, and the one or more repeating centroids are to transition to the second non-repeating centroid, wherein the one or more repeating centroids repeat the first non-repeating centroid such that the sequential list of centroids has a temporal dimension represented by the one or more repeating centroids;

a filter, implemented at least partly in one or more of configurable logic or fixed-functionality logic hardware, to remove the temporal dimension from the sequential list to obtain a reduced list of centroids lacking temporal variability, wherein to remove the temporal dimension to obtain the reduced list, the filter is to remove the one or more repeating centroids from the sequential list while each of the non-repeating centroids from the sequential list is retained so that each of the non-repeating centroids is in the reduced list and the first non-repeating centroid in the reduced list is to transition to the second non-repeating centroid in the reduced list;

a parameter module, implemented at least partly in one or more of configurable logic or fixed-functionality logic hardware, to generate a set of Hidden Markov Model (HMM) parameters based on the reduced list of centroids lacking the temporal variability; and a detection module, implemented at least partly in one or more of configurable logic or fixed-functionality logic hardware, to determine a match probability for detection samples against the set of HMM parameters.

2. The apparatus of claim 1, wherein the sequential list of centroids is to be associated with a set of clusters having a one-to-one mapping to states in the HMM.

3. The apparatus of claim 1, wherein the partition module includes:
a cluster unit, implemented at least partly in one or more of configurable logic or fixed-functionality logic hardware, to determine a set of clusters for the plurality of training samples;
a centroid unit, implemented at least partly in one or more of configurable logic or fixed-functionality logic hardware, to determine a set of cluster centroids corresponding to the set of clusters; and
an assignment unit, implemented at least partly in one or more of configurable logic or fixed-functionality logic hardware, to assign each training sample in the plurality of training samples to a centroid in the set of cluster centroids to partition the plurality of training samples into the sequential list of centroids.

4. The apparatus of claim 1, wherein centroids, that are associated with the detection samples, are subjected to a forward algorithm to determine the match probability against the set of HMM parameters.

5. A method to process training samples, comprising:
partitioning, with a computing device, a plurality of training samples selected from human movement samples or human verbal samples into a sequential list of centroids including non-repeating centroids and one or more repeating centroids, wherein the sequential list has a first of the non-repeating centroids, the one or more repeating centroids and a second of the non-repeating centroids in that stated order so that the first non-repeating centroid is to transition to the one or more repeating centroids, and the one or more repeating centroids are to transition to the second non-repeating centroid, wherein the one or more repeating centroids repeat the first non-repeating centroid such that the sequential list of centroids has a temporal dimension represented by the one or more repeating centroids;

modifying, with the computing device, the sequential list to remove the temporal dimension from the sequential list to obtain a reduced list of centroids lacking temporal variability, wherein the modifying to remove the temporal dimension includes removing the one or more repeating centroids from the sequential list while retaining each of the non-repeating centroids from the sequential list so that each of the non-repeating centroids is in the reduced list and the first non-repeating centroid in the reduced list is to transition to the second non-repeating centroid in the reduced list; and generating, with the computing device, a set of Hidden Markov Model (HMM) parameters based on the reduced list of centroids lacking the temporal variability; and determining a match probability for detection samples against the set of HMM parameters.

6. The method of claim 5, wherein the sequential list of centroids is associated with a set of clusters having a one-to-one mapping to states in the HMM.

7. The method of claim 5, wherein partitioning the plurality of training samples includes:
determining a set of clusters for the plurality of training samples;
determining a set of cluster centroids corresponding to the set of clusters; and
assigning each training sample in the plurality of training samples to a centroid in the set of cluster centroids to partition the plurality of training samples into the sequential list of centroids.

8. The method of claim 5, wherein centroids, that are associated with the detection samples, are subjected to a forward algorithm to determine the match probability against the set of HMM parameters.

9. A method to process detection samples, comprising:
partitioning, with a computing device, a plurality of detection samples selected from human movement samples or human verbal samples into a sequential list of centroids including non-repeating centroids and one or more repeating centroids, wherein the sequential list has a first of the non-repeating centroids, the one or more repeating centroids and a second of the non-repeating centroids in that stated order so that the first non-repeating centroid is to transition to the one or more repeating centroids, and the one or more repeating centroids are to transition to the second non-repeating centroid, wherein the one or more repeating centroids repeat the first non-repeating centroid such that the sequential list of centroids has a temporal dimension represented by the one or more repeating centroids;

modifying, with the computing device, the sequential list to remove the temporal dimension from the sequential list to obtain a reduced list of centroids lacking temporal variability, wherein the modifying to remove the temporal dimension includes removing the one or more repeating centroids from the sequential list while retaining each of the non-repeating centroids from the sequential list so that each of the non-repeating centroids is in the reduced list and the first non-repeating centroid in the reduced list is to transition to the second non-repeating centroid in the reduced list; and determining, with the computing device, a match probability for the plurality of detection samples against a set of Hidden Markov Model (HMM) parameters, that are associated with a training session, based on the reduced list of centroids lacking the temporal variability.

10. The method of claim 9, wherein the sequential list of centroids is associated with a set of clusters having a one-to-one mapping to states in the HMM.

11. The method of claim 9, wherein using the reduced list of centroids to determine the match probability includes applying a sliding window to the reduced list of centroids, and wherein the sliding window has a fixed width that equals a number of states in the HMM.

12. The method of claim 9, wherein the determining includes subjecting the reduced list of centroids and the HMM parameters to a forward algorithm to determine the match probability.

13. At least one non-transitory computer readable storage medium comprising a set of instructions which, when executed by a computing device, cause the computing device to:
partition a plurality of detection samples selected from human movement samples and human verbal samples into a sequential list of centroids including non-repeating centroids and one or more repeating centroids, wherein the sequential list has a first of the non-repeating centroids, the one or more repeating centroids and a second of the non-repeating centroids in that stated order so that the first non-repeating centroid is to transition to the one or more repeating centroids, and the one or more repeating centroids are to transition to the second non-repeating centroid, wherein the one or more repeating centroids repeat the first non-repeating centroid such that the sequential list of centroids has a temporal dimension represented by the one or more repeating centroids;

modify the sequential list to remove the temporal dimension from the sequential list to obtain a reduced list of centroids lacking temporal variability, wherein to modify the sequential list to remove the temporal dimension, the computing device is to remove the one or more repeating centroids from the sequential list while each of the non-repeating centroids from the sequential list is retained so that each of the non-repeating centroids is in the reduced list and the first non-repeating centroid in the reduced list is to transition to the second non-repeating centroid in the reduced list; and determine a match probability for the plurality of detection samples against a set of Hidden Markov Model (HMM) parameters, that are associated with a training session, based on the reduced list of centroids lacking the temporal variability.

14. The at least one non-transitory computer readable storage medium of claim 13, wherein the sequential list of centroids is to be associated with a set of clusters have a one-to-one mapping to states in the HMM.

15. The at least one non-transitory computer readable storage medium of claim 13, wherein the instructions, when executed, cause a computing device to apply a sliding window to the reduced list of centroids to use the reduced list to determine the match probability, and wherein the sliding window is to have a fixed width that equals a number of states in the HMM.

16. The at least one non-transitory computer readable storage medium of claim 13, wherein the reduced list of centroids and the HMM parameters are subjected to a forward algorithm to determine the match probability.

* * * * *